United States Patent [19]

Serini et al.

[11] Patent Number: 4,746,711
[45] Date of Patent: May 24, 1988

[54] MIXTURES OF AROMATIC POLYCARBONATES AND AROMATIC POLYESTER-CARBONATES, AND THEIR USE FOR THE PRODUCTION OF MOULDINGS, FILMS, FIBRES, FILAMENTS AND COATINGS

[75] Inventors: Volker Serini; Dieter Freitag, both of Krefeld; Dietrich Rathmann, Leverkusen, all of Fed. Rep. of Germany

[73] Assignee: Bayer Aktiengesellschaft, Leverkusen, Fed. Rep. of Germany

[21] Appl. No.: 918,787

[22] Filed: Oct. 14, 1986

[30] Foreign Application Priority Data

Oct. 23, 1985 [DE] Fed. Rep. of Germany ....... 3537622

[51] Int. Cl.$^4$ ...................... C08L 67/02; C08L 69/00
[52] U.S. Cl. ..................................... 525/439; 524/537
[58] Field of Search ......................................... 525/439

[56] References Cited

U.S. PATENT DOCUMENTS

| | | | |
|---|---|---|---|
| 4,269,964 | 5/1981 | Freitag | 528/126 |
| 4,465,820 | 8/1984 | Miller | 528/194 |
| 4,469,850 | 9/1984 | Belfoure | 525/439 |

FOREIGN PATENT DOCUMENTS

| | | | |
|---|---|---|---|
| 1173998 | 9/1984 | Canada . | |
| 55-131048 | 10/1980 | Japan | 525/439 |

*Primary Examiner*—Patricia A. Short
*Attorney, Agent, or Firm*—Connolly & Hutz

[57] ABSTRACT

Mixtures of aromatic polycarbonates and aromatic polyester-carbonates having a specific polycarbonate/polyester-carbonate ratio and a defined ester content in the polyester-carbonates, at least one of the polycondensates containing $C_8$–$C_9$–alkylated phenyl end groups, possess a reduced tendency to stress cracking.

9 Claims, No Drawings

MIXTURES OF AROMATIC POLYCARBONATES AND AROMATIC POLYESTER-CARBONATES, AND THEIR USE FOR THE PRODUCTION OF MOULDINGS, FILMS, FIBRES, FILAMENTS AND COATINGS

The invention relates to mixtures of aromatic polycarbonates and aromatic polyester-carbonates which can be processed by thermoplastic means and which have a low tendency to stress cracking, and to their use for the production of mouldings, films, fibres, filaments and coatings.

By virtue of their good impact strength and notched impact strength and their good flow in the melt, aromatic polycarbonates have found wide use for the production of mouldings, films and coatings. Aromatic polyester-carbonates exhibit a combination of these properties and the high dimensional stability under heat of purely aromatic polyesters.

Many desirable combinations of properties can be obtained by mixing aromatic polycarbonates and aromatic polyester-carbonates (JP-A Nos. 55/058,248, 55/131,048 and 55/133,445).

Although these mixtures exhibit a number of interesting properties, for example high glass transition temperature and good heat resistance, impact strength and processability, they cannot give complete satisfaction in respect of their stress cracking behaviour.

It has now been found, surprisingly, that mixtures of aromatic polycarbonates (free from ester groups) and aromatic polyester-carbonates having a specific polycarbonate/polyester-carbonate ratio and having a defined ester content in the polyester-carbonate, at least one of the polycondensates containing $C_8$–$C_9$-alkylated phenyl end groups, have a reduced tendency to stress cracking.

The invention relates to mixtures consisting of:

I. an aromatic polycarbonate and
II. an aromatic polyester-carbonate, characterized in that (a) the mixture contains 5 to 70, preferably 10 to 65 and especially 15 to 60, % by weight of I and 95 to 30, preferably 90 to 35 and especially 85 to 40, % by weight of II, the percentages of I and II relating to the sum of I+II, (b) the ester group content of the polyester-carbonate II is 60 to 95, preferably 60 to 85 and especially 70 to 80, mol%, relative to the sum of the ester and carbonate groups in II, and (c) at least one of the components I and II contains end groups of the formula

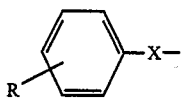

(I)

wherein
—X— represents —O— or —CO— and
R represents a branched alkyl radical having 8 to 9 C atoms, subject to the proviso that the proportion of methyl hydrogen atoms in the alkyl radical R is 47 to 89%, relative to the total of the hydrogen atoms in the alkyl radical, and that R is in the o-position and-/or p-position.

Diphenols which are preferred for the preparation of the polycarbonates I or the polyester-carbonates II are compounds of the formula

HO—Z—OH      (II)

wherein Z denotes a divalent, mononuclear or polynuclear aromatic radical having in each case 6–30 C atoms, the composition of Z being such that the two OH groups are each directly attached to a C atom of an aromatic system.

Diphenols which are particularly preferred are compounds of the formula

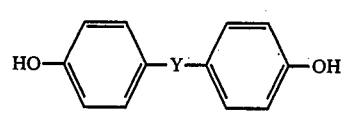

(III)

in which
Y denotes a single bond, an alkylene or alkylidene radical having in each case 1–7 C atoms, a cycloalkylene or cycloalkylidine radical having in each case 5–12 C atoms,

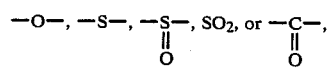

and also derivatives thereof which are alkylated and-/or halogenated in the nucleus, for example: hydroquinone, resorcinol, dihydroxybiphenyls, bis-(hydroxyphenyl)-alkanes, bis-(hydroxyphenyl) cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones, α',α'-bis-(hydroxyphenyl)-diisopropylbenzenes and phthaleins,
and also compounds thereof which are alkylated and/or halogenated in the nucleus. These and other suitable diphenols are described, for example, in U.S. Pat. Nos. 3,028,365, 3,275,601, 3,148,172, 3,062,781, 2,991,273, 3,271,367, 2,999,835, 2,970,131 and 2,999,846, in German Offenlegungsschriften (German Published Specifications) Nos. 1,570,704, 2,064,050, 2,063,052, 2,211,956 and 2,211,957, in French Patent Specification No. 1,561,518 and in the Monograph "H. Schnell, Chemistry and Physics of Polycarbonates, Interscience Publishers, New York, 1964".

The most important diphenols may be listed individually, as follows: bisphenol A, bis-(4-hydroxyphenyl) methane, bis-(4-hydroxyphenyl)-2-butene, bis-(4-hydroxyphenyl), 1,1-bis-(4-hydroxyphenyl)-cyclohexane, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, bis-(4-hydroxyphenyl) sulphide, bis-(4-hydroxyphenyl) sulphone, α',α'-bis-(4-hydroxyphenyl)-p-diisopropylbenzene and phenolphthalein.

In accordance with a preferred embodiment, the polycarbonates I and/or the polyester-carbonates II contain, independently of one another, at least 70, preferably at least 90 and especially 100, mol% of bisphenol A radicals relative to incorporated diphenol units.

The polyester-carbonates II are polycondensates based on diphenols (see above), aromatic dicarboxylic acids, carbonic acid derivatives and, if appropriate, branching agents. In accordance with a preferred embodiment, the polyester-carbonates II contain at least 70, preferably at least 90 and especially 100, mol% of isophthalic and/or terephthalic acid radicals, relative to incorporated dicarboxylic acid units. In addition to isophthalic and/or terephthalic acid radicals, the preferred polyester-carbonates II can contain up to 30, preferably up to 10, mol% of co-condensed radicals of other aromatic dicarboxylic acids having 8 to 18 C atoms, such as, for example, radicals of: o-phthalic acid, 5-tert.-butylisophthalic acid, monochloroterephthalic acid, 2,5-dichloroterephthalic acid, diphenyl-ether-4,4'-dicarboxylic acid, 1,2-diphenoxyethane-4,4'-dicarboxylic acid, diphenylmethane-4,4'-dicarboxylic acid, biphenyl-4,4'-dicarboxylic acid, naphthalene-1,4-dicarboxylic acid, naphthalene-1,8-dicarboxylic acid or mixtures thereof.

The proportion of terepthalic acid radicals in the isophthalic and terephthalic acid radicals of the polyester-carbonates II is 0 to 100, preferably 2 to 15, 30 to 70 and 80 to 97 and especially 5 to 10, 40 to 60 and 85 to 94, %.

The polycarbonates I or polyester-carbonates II of the mixtures according to the invention contain 0.5 to 20, preferably 1.0 to 15 and especially 2 to 10, mol% of the end groups I, relative to the sum of the diphenol radicals which are co-condensed in the polycarbonates I and in the polyester-carbonates II.

Mixtures of polycarbonate I and polyester-carbonate II in which the predominating partner in terms of weight contains end groups of the formula I are preferred. However, mixtures in which both the polycarbonate I and the polyester-carbonate II contain end groups of the formula I are preferred particularly.

Preferred end groups I are those in which at least 80%, especially 100%, of the substituent R are in the p-position.

The following are examples of end groups of the formula I which are preferred in accordance with the invention

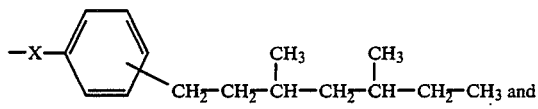

The polycarbonates I and the polyester-carbonates II as a rule have relative viscosities of 1.15 to 2.0, preferably 1.2 to 1.5 (measured in a 0.5% strength by weight solution in methylene dichloride at 25° C.).

Polycarbonate I and polyester-carbonate II containing end groups I are known (DE-OS (German Published Specifications) Nos. 2,842,005 and 3,007,934). They can be prepared by various known processes, for example by melt transesterification, by the so-called pyridine process in a homogeneous solution and by the two-phase boundary process.

The polyester-carbonates II can contain the carbonate or ester groups in the form of blocks or statistically distributed, depending on the process of preparation.

Mixing of the components I and II can, for example, be carried out via the melt of the components. In this process, conditions which favour transesterification of the components I and II to give a polyester-carbonate will be avoided, that is to say in the case of an extrusion, for example, the lowest possible temperatures and the shortest possible dwell times will be selected. The absence of transesterification catalysts is preferred. If transesterification catalysts are present (for example in products which have been prepared by melt transesterification), these catalysts will be deactivated in a rational manner. It is then possible largely to avoid transesterification. Under favourable conditions, transesterification takes place to the extent of not more than 50, preferably not more than 30 and especially not more than 10, % by weight; in other words: a least 50, preferably at least 70 and especially at least 90, % by weight of unchanged starting material is present.

The mixtures according to the invention can be distinguished from polyester-carbonates of the same overall composition by means of differential thermoanalysis.

It is possible to add to the mixtures according to the invention fillers and reinforcing materials, such as, for example, minerals, carbon black, glass fibres, carbon fibres, metal fibres, dyestuffs, pigments, stabilizers against heat, oxidation and UV, plasticizers, lubricants, mould release agents, additives which impart flame-resistance, such as, for example, halogenated organic compounds, metal oxides, metal salts and other additives.

The mixtures according to the invention can be used, for example, for the production of lenses, lamp reflectors, automobile headlamp reflectors, lamp masks, lamp caps, lamp canopies, high-voltage switchgear, multipoint connectors, meter cases and microwave tableware.

EXAMPLES

The polycarbonates and polyester-carbonates which are used:

1. Bisphenol A polycarbonate having 3.3 mol% of isooctylphenyl end groups; $\eta_{rel}=1.283$ (PC-J)

2. Bisphenol A polycarbonate having 3.3 mol% of phenyl end groups; $\eta_{rel}=1.280$ (PC-P)

3. Polyester-carbonate obtained from bisphenol A, equal parts of isophthalic and terephthalic acid dichloride and phosgene, having 3.7 mol% of isooctylphenyl end groups, 74 mol% of ester groups and 26 mol% of carbonate groups (relative to the sum of the ester and carbonate groups); $\eta_{rel}=1.288$ (PEC-J 80)

4. Polyester-carbonate as in 3), but 3.7 mol% of phenyl end groups; $\eta_{rel}=1.289$ (PEC-P 80).

The components 1 and 3 on the one hand, and 2 and 4 on the other hand, were melted in a ratio by weight of 20:80 and 50:50 by means of a twin-screw extruder. Accordingly, the resulting mixtures had the following overall compositions:

(a) 64% by weight of ester groups (M-PEC-J 64; $\eta_{rel}=1.278$)

(b) 40% by weight of ester groups (M-PEC-J 40; $\eta_{rel}=1.275$)

(c) 64% by weight of ester groups (M-PEC-P 64; $\eta_{rel}=1.277$)

(d) 40% by weight of ester groups (M-PEC-P 40; $\eta_{rel}=1.278$).

Small standard bars were injection-moulded at 330° C. from the mixtures (a) to (d) and were stored in the air at 25° C. 20 small standard bars of each mixture were stored and were investigated for stress cracking after specific times, as can be seen in the table. It was found that the polyester-carbonate mixtures according to the invention had the highest resistance to stress cracking.

| Storage time in air at 25° C. [days] | Number of specimens having stress cracking (edge cracks) from a group of 20 specimens in each case | | | |
|---|---|---|---|---|
| | (a) M-PEC-I 64 | (c) M-PEC-P 64 (comparison) | (b) M-PEC-I 40 | (d) M-PEC-P 40 (comparison) |
| 1 | 0 | 3 | 0 | 4 |
| 7 | 1 | 8 | 2 | 7 |
| 28 | 5 | 16 | 4 | 15 |

What is claimed is:

1. Mixtures consisting of: I. an aromatic polycarbonate and II. an aromatic polyester-carbonate, characterized in that:
   (a) the mixture contains 5 to 70% by weight of I and 95 to 30% by weight of II, the percentages of I and II relating to the sum of I+II,
   (b) the ester group content of the polyester-carbonate II is 60 to 95 mol%, relative to the sum of ester and carbonate groups in II, and
   (c) at least one of the components I and II contains end groups of the formula

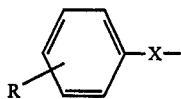 (I)

wherein
—X— represents —O— or —CO— and
R represents a branched alkyl radical having 8 to 9 C atoms, subject to the proviso that the proportion of methyl hydrogen atoms in the alkyl radical R is 47 to 89%, relative to the total of the hydrogen atoms in the alkyl radical, and that R is in the o-position or in the p-position.

2. Mixtures according to claim 1, characterized in that they contain 10 to 65% by weight of I and 90 to 35% by weight of II.

3. Mixtures according to claim 1, characterized in that they contain 15 to 60% by weight of I and 85 to 40% by weight of II.

4. Mixtures according to claim 1, characterized in that the ester group content of the polyester-carbonate II is 60 to 85 mol%.

5. Mixtures according to claim 1, characterized in that the ester group content of the polyester-carbonate II is 70 to 80 mol%.

6. Mixtures according to claim 1, characterized in that the components I and II contain at least 70 mol% of bisphenol A radicals, relative to incorporated diphenol radicals.

7. Mixtures according to claim 1, characterized in that at least one of the components I and II contains 100 mol% of bisphenol A radicals, relative to incorporated diphenol radicals.

8. Mixtures according to claim 1, characterized in that the end groups of the formula I are selected from the groups consisting of

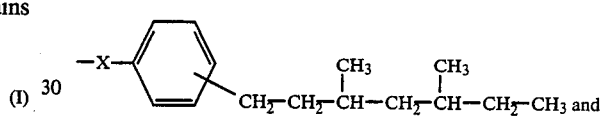

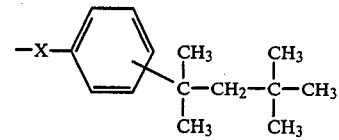

9. Moldings, films, fibers, filaments or coatings prepared from the mixture according to claim 1.

* * * * *